Feb. 23, 1932.  C. C. QUINN  1,846,455
MUD CUP FOR HOG WATERERS
Filed Feb. 24, 1930
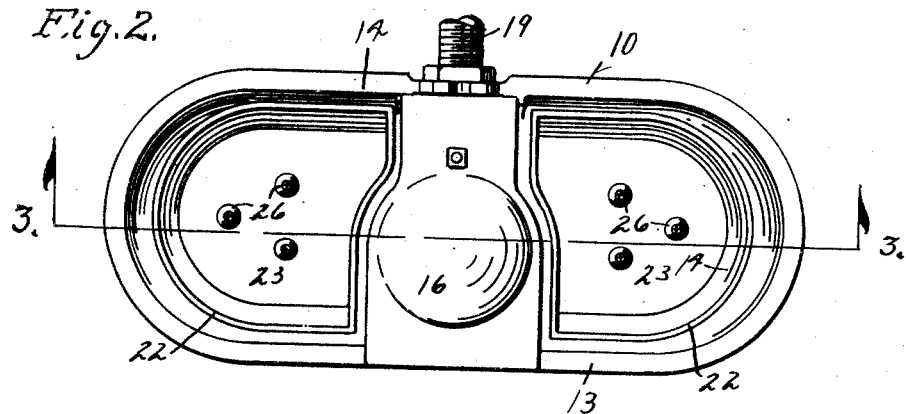
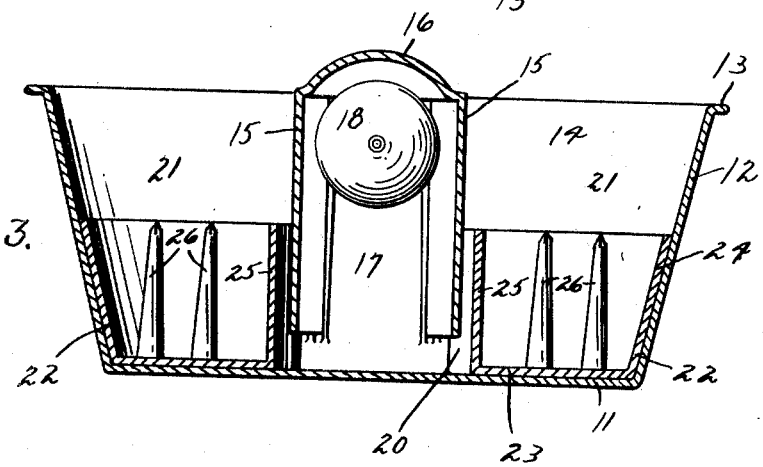
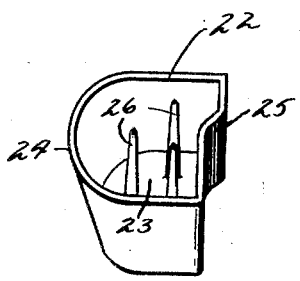
Inventor
Charles C. Quinn
by Orwig & Hague Attys Patented Feb. 23, 1932

1,846,455

UNITED STATES PATENT OFFICE

CHARLES C. QUINN, OF BOONE, IOWA, ASSIGNOR TO QUINN WIRE & IRON WORKS, OF BOONE, IOWA

MUD CUP FOR HOG WATERERS

Application filed February 24, 1930. Serial No. 430,973.

The object of my invention is to provide improved means in the nature of a detachable cup which may be applied to the interior of the drinking compartment of a hog waterer, and when so applied adapted to receive and contain the precipitated mud and foreign substances within the water, so that the mud and foreign substances may be easily and quickly removed by simply lifting the cup out of the drinking compartment and emptying the cup; and to provide in connection with the cup, means whereby the animal is prevented from agitating and disturbing the mud which has settled in the bottom of the cup.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of my improved mud cup.

Figure 2 is a plan view of a hog waterer, showing my improved mud cup applied thereto; and Figure 3 is a detail sectional view taken on the line 3—3 of Figure 2.

The numeral 10 indicates a hog waterer of ordinary construction, which is provided with a bottom 11, end members 12, a front 13 and a back 14. The chamber thus formed is usually provided with transverse partitions 15 having a cover 16 to form a float chamber 17, the ordinary float 18 being mounted therein and a supply pipe 19 for feeding water to the float chamber through automatic valve arrangement not illustrated. The lower edges of the partitions 15 terminate a slight distance above the bottom level so that passages 20 are formed to permit water to flow out of the chamber 17 into the drinking compartments 21 formed in each end of the waterer 10.

Considerable difficulty has been experienced in the past, due to the fact that dirt and mud would be collected in the drinking compartments, which would very rapidly fill the bottom of the compartments 21 to such an extent as to seal the passages 20, at which time it was necessary to clean the water, which was a very difficult and tedious operation.

I have overcome this difficulty by providing in each of the drinking compartments 21 a mud cup 22, clearly illustrated in Figure 1. The said cup comprises a bottom member 23 and vertical wall members 24 shaped to fit the contour of the inner surface of the compartments 21, each cup being provided with an end member 25 designed to be supported a slight distance outside of the partitions 15 so as to permit water to flow upwardly between the partition 15 and the members 25.

The upper face of each of the bottom members 23 is provided with a series of upwardly projecting pins 26, which preferably terminate in a height substantially equal to the height of the wall members 24. The pins 26 provide means for preventing the animal from crowding his snout down into the cup 22 and agitating any mud that might have settled therein, the upper ends of the pins 26 being preferably sharpened.

The pins 26 also perform the function of providing handle means which may be gripped by the operator's fingers to assist in lifting the cup out of the drinking compartments.

Thus it will be seen that I have provided a detachable mud cup for hog waterers, which is of simple, durable and inexpensive construction, and which at the same time provides means for collecting substantially all of the mud and foreign matter as it is precipitated from the water in the drinking compartments, and which may be easily and quickly emptied, and have provided in connection therewith means whereby the animal may be prevented from agitating the mud in the cup after it has settled.

I claim as my invention:

1. A mud cup for hog waterers, designed to be supported in the bottom of the drinking compartments of a hog waterer, said cup having a series of pins projecting upwardly from the central portion of its bottom member.

2. A mud cup for hog waterers, designed to be supported in the bottom of the drinking compartments of a hog waterer, said cup having a series of pins projecting upwardly from the central portion of its bottom member, said pins having their upper ends pointed.

3. In combination, a hog waterer having a float chamber and a drinking compartment adjacent to the float chamber, a detachable mud cup supported in said drinking chamber, the sides of said cup being designed to fit the sides of said drinking chamber so that the cup will receive any precipitated mud within the drinking chamber and prevent clogging of said float chamber, the inner surface of said cup being provided with upwardly projecting pins pointed at their free ends.

4. A mud cup for hog waterers having a bottom and side members, the open end of said cup being provided with pointed obstructions for the purposes stated.

5. In combination, a hog waterer having a drinking compartment, the interior of said drinking compartment being provided with obstructing means whereby water and mud will be permitted to settle to the bottom of the drinking compartment and to provide means for excluding an animal's snout, the top of said obstructing means being intermediate the top and bottom portions of said cup to provide a drinking space above said obstruction.

Des Moines, Iowa, January 24, 1930.

CHARLES C. QUINN.